United States Patent [19]

Moritake et al.

[11] Patent Number: 4,825,254

[45] Date of Patent: Apr. 25, 1989

[54] FILM PRESSING DEVICE

[75] Inventors: Makoto Moritake; Shuichi Ohtsuka, both of Kanagawa, Japan

[73] Assignee: Fuji Photo Film Co., Ltd., Kanagawa, Japan

[21] Appl. No.: 95,503

[22] Filed: Sep. 11, 1987

[30] Foreign Application Priority Data

Sep. 11, 1986 [JP] Japan ............................... 61-214916

[51] Int. Cl.[4] ............................................... G03B 27/72

[52] U.S. Cl. ......................................... 355/71; 355/72

[58] Field of Search ...................... 355/3 R, 27, 65, 71, 355/72, 73, 76, 99, 100

[56] References Cited

U.S. PATENT DOCUMENTS

| | | | |
|---|---|---|---|
| 1,478,599 | 12/1923 | Capstaff | 355/27 |
| 2,312,472 | 3/1943 | Oiler | 355/65 X |
| 4,113,373 | 9/1978 | Eppe et al. | 355/71 X |
| 4,392,734 | 7/1983 | Plumadore | 355/27 X |
| 4,622,915 | 11/1986 | Ohtsuka et al. | 355/10 X |
| 4,623,249 | 11/1986 | Grant | 356/124 |
| 4,624,554 | 11/1986 | Ohtsuka et al. | 355/64 |
| 4,697,912 | 10/1987 | Sato et al. | 355/3 R |
| 4,727,393 | 2/1988 | Ohtsuka et al. | 355/3 R |
| 4,760,425 | 7/1988 | Okano et al. | 355/10 |

*Primary Examiner*—Fred L. Braun

*Attorney, Agent, or Firm*—Sughrue, Mion, Zinn, Macpeak & Seas

[57] ABSTRACT

A film pressing device for use in an electrophotographic apparatus and adapted for pressing an electrophotographic film onto a processing head in the apparatus. The device includes a pressing plate for pressing the electrophotographic film onto the processing head and having a through-hole formed in the pressing plate for allowing a projecting light to pass therethrough. A light-shielding plate is provided on the pressing plate at one side of the through-hole so as to prevent any portion of the projecting light failing to pass through the through-hole from impinging upon portions of the electrophotographic film which are to be kept away from the projecting light. Thus, any portion of the light scattered from the light path between the projecting light source and the through-hole is prevented from reaching such portions of the electrophotographic film.

11 Claims, 18 Drawing Sheets

54
98
100
102
104
106
108
110
112
114
116
118
120
122
124
126
128
130
132
134
136
138
140
142
144
146
148
150
152
154
156
158
160
162

FILM PRESSING DEVICE

BACKGROUND OF THE INVENTION

1. Field of the Invention

The present invention relates to a film pressing device for pressing add positioning a photosensitive film which is adapted for use in an apparatus in which an exposure for forming an image on the photosensitive film and a projection of the image formed are effected at an identical position.

2. Description of the Related Art

One type of photographic apparatus has heretofore been known which is capable of recording an image on a predetermined frame of a photographic film and of projecting or copying the recorded image. This type of apparatus is disclosed in, for example, U.S. Pat. Nos. 3,528,355, 3,697,176, 3,964,828, 3,972,610 and 4,461,561.

Also, regarding the photographic film, there are various known photosensitive films such as a silver halide film, an electrophotographic film, an electrophotographic migration imaging film (cf. Journal of Applied Photographic Engineering, Vol. 9, No. 1, 1983), and the like. Hereinafter, an apparatus to which the electrophotographic film is applied as the photosensitive film is described.

A processing head is disposed in such photographic apparatus to subject an electrophotographic film to various kinds of processing such as charging/exposure and development and such processing head is known from the specifications of U.S. Pat. No. 4,600,291.

The processing head disclosed in the above-mentioned publications has a charging/exposure section, a developing section, a drying section and a fixing section which are arranged in series in the mentioned order along the path of feed of the electrophotographic film, at a pitch or interval which corresponds to the pitch of frames on the electrophotographic film.

In the charging/exposure section, the portion of the electrophotgraphic film located in this section, constituting one frame, is charged and then exposed to an image light from an original, so that an electrostatic latent image corresponding to the pattern of an image carried by the original is formed in this portion of the film. The film is then fed so as to bring the exposed frame to the developing section where a liquid developing agent is applied to the electrophotographic film so as to develop the latent image thereby making it visible. Subsequently, the frame is brought to the drying section where drying air is blown to the electrophotographic film wetted by the liquid developing agent so as to remove moisture component from the film. Finally, the frame is brought to the fixing section where the developed image is fixed to the electrophotographic film by means of, for example, a fixing lamp.

The processing head also is capable of applying a projecting light to the developed image, thereby enabling the developed image to be projected onto a screen. More specifically, the projecting light is applied to the image on the portion of the electrophotogaphic film which is in the charging/exposure section of the processing head, through an aperture formed in a pressing means for pressing the electrophotographic film onto the processing head. The pressing means is disposed at a position which is spaced from the processing head by a large distance so as to prevent the electrophotographic film from becoming damaged due to contact with the processing head or with the pressing means during running of the electrophotographic film or during the loading of the electrophotographic film.

The projection of the developed image also requires an optical system for applying the projecting light onto the film, and a light shielding member for shielding from the projecting light the portions of the electrophotographic film other than the image to be projected. Such optical system and light shielding member have to be installed away from the path of the film so that they may not interfere with the film.

Thus, in the known arrangement described above, the pressing means is spaced apart by a large distance from the processing head and the light-shielding member is positioned behind the pressing means. This arrangement poses a problem in that a large gap is formed between the pressing means and the light-shielding member when the electrophotographic film is pressed onto the processing head by the pressing means, with the result that the projecting light undesirably reach the frames other than the frame to be projected, thereby adversely affecting frames which carry latent images which have not been developed yet.

SUMMARY OF THE INVENTION

Accordingly, an object of the present invention is to provide a film pressing device for use in an apparatus, which is improved in such a way as to avoid application of projecting light to the frames on photosensitive film other than the frame to be projected, thereby overcoming the above-described problems of the prior art.

To this end, according to one aspect of the present invention, there is provided a film pressing device for use in an apparatus in which an exposure for forming an image on a photosensitive film and a projection of the image formed on the film are effected at an identical position and intended for pressing the photosensitive film at the identical position in the apparatus, comprising: pressing means for pressing the photosensitive film at the identical position; a through-hole formed in the pressing means and adapted for allowing a projecting light to pass therethrough for the purpose of projecting the image formed on the photosensitive film; and light-shielding means for preventing the portion of the projecting light failing to pass through the through-hole from impinging upon the photosensitive film.

In operation, the projecting light is applied through the through-hole formed in the pressing means onto the frame to be projected. In the event that any portion of the projecting light is directed laterally of the through-hole, such portion of the light is shielded without fail by the light-shielding plate, thereby preventing the frames adjacent to the frame to be projected from being accidentally irradiated by the projecting light.

The above and other objects, features and advantages of the present invention will become clear from the following description of the preferred embodiments taken in conjunction with the accompanying drawings.

DESCRIPTION OF THE PREFERRED EMBODIMENT

Figure 1:
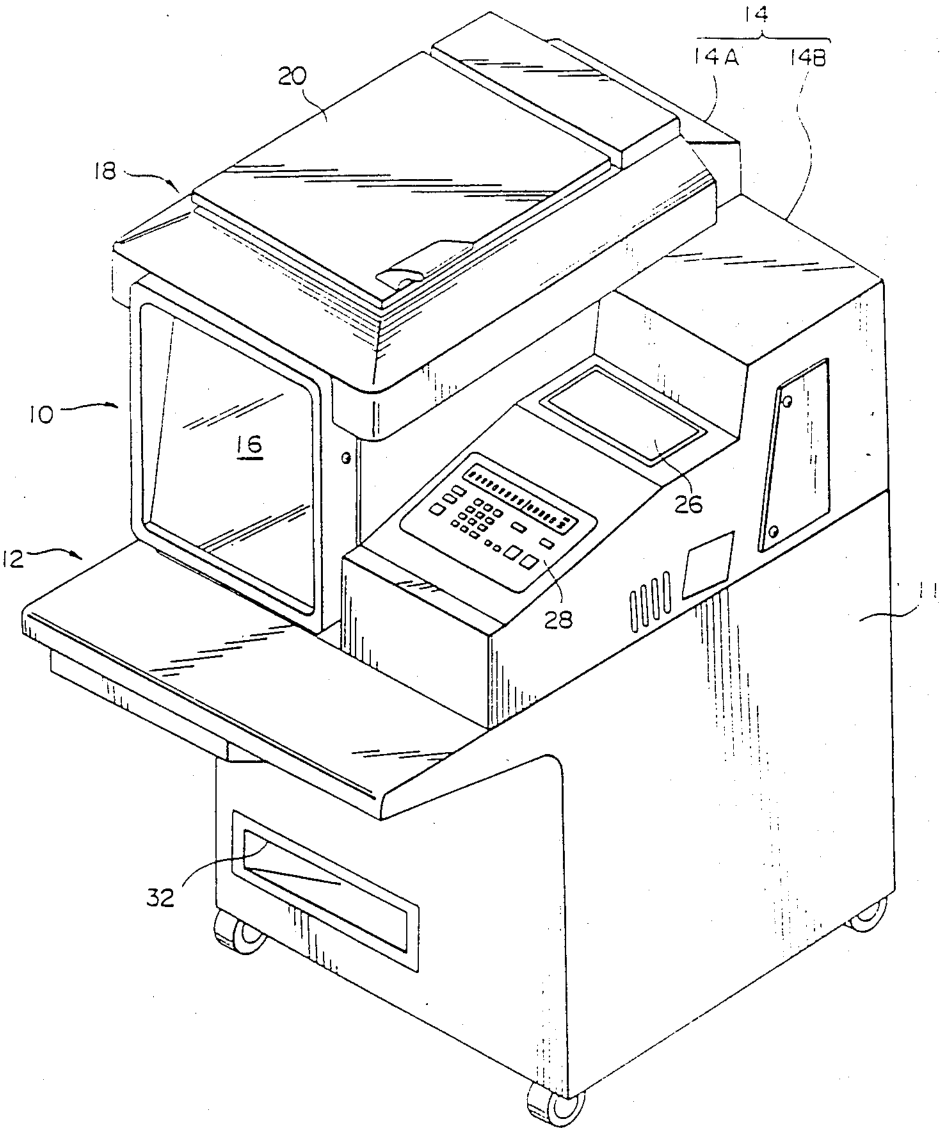
FIG. 1 is a perspective view of an electrophotographic apparatus to which the present invention pertains.

FIG. 1 shows one example of an electrophotographic apparatus having a processing head to which the present invention pertains. The electrophotographic apparatus has various functions: namely, the camera function which enables the image of a document to be recorded on an electrophotographic film; the reader function which enables the image recorded on the film to be enlarged and projected on a screen; and the copy function which enables the image recorded on the film to be enlarged and copied on a sheet of copying paper.

The electrophotographic apparatus has an integral structure which consists of an electrophotographic apparatus body 10, a housing 11, and a copying machine 12 serving also as a table for mounting the body 10. When the copy function is not needed, the electrophotographic apparatus body 10 may be used alone. The apparatus body 10 includes a housing 14 which consists of a left-hand portion 14A having a substantially rectangular parallelepiped configuration and a right-hand portion 14B which has a stepped upper surface. The respective internal spaces of these portions 14A and 14B are communicated with each other at the side thereof which is closer to the rear end of the apparatus.

A rear projection screen 16 is disposed in the housing portion 14A in such a manner that the screen 16 closes an opening provided in the front side of the housing portion 14A and is slightly slanted rearwardly. A document table 18 is disposed on the upper side of the housing portion 14A. The document table 18 includes a document pressing plate 20 which can be opened and closed as desired, and a transparent glass plate 22 (see FIG. 2) which is disposed underneath the plate 20 in such a manner as to close an opening provided in the upper side of the housing portion 14A. A cassette loading section 26 into which a cassette 314 (see FIGS. 17 and 18) accommodating an electrophotographic microfilm 24 (see FIG. 2; hereinafter referred to as an "electrophotographic film") is loaded is provided in the central portion of the upper side of the housing portion 14B. A control keyboard 28 through which various controls of the electrophotographic apparatus are effected is disposed on the front portion of the upper side of the housing portion 14B.

Figure 4:
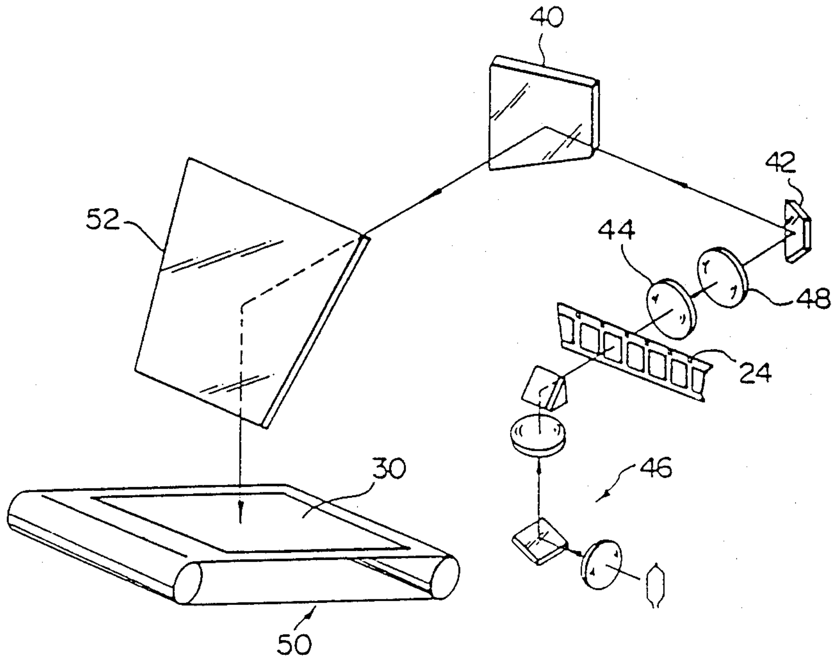
FIG. 4 is a perspective view illustrating the concept of a copying optical system in the electrophotographic apparatus.

The housing 11 of the copying machine 12 is provided with an opening 32 for delivering a copied sheet of paper 30 (see FIG. 4).

Figure 2:
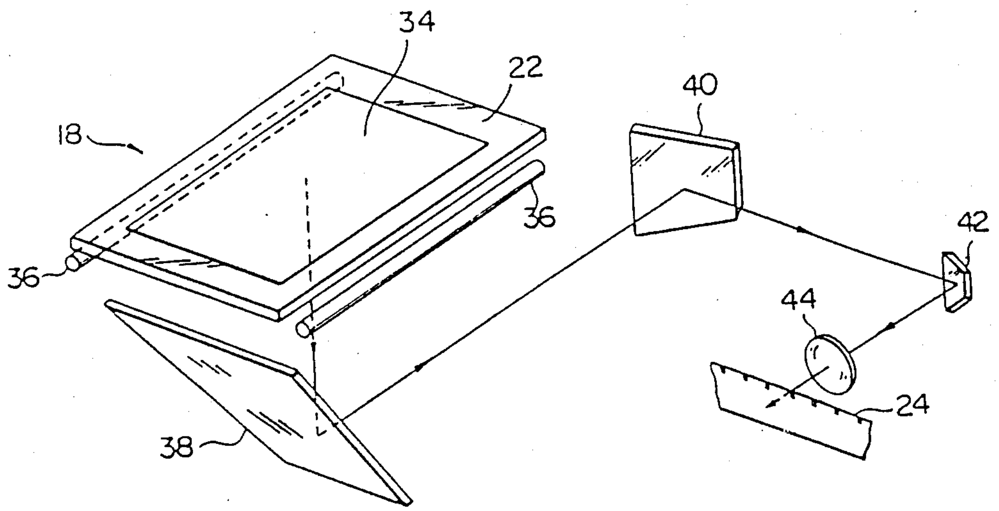
FIG. 2 is a perspective view illustrating the concept of a photographic optical system in the electrophotographic apparatus.
Figure 3:
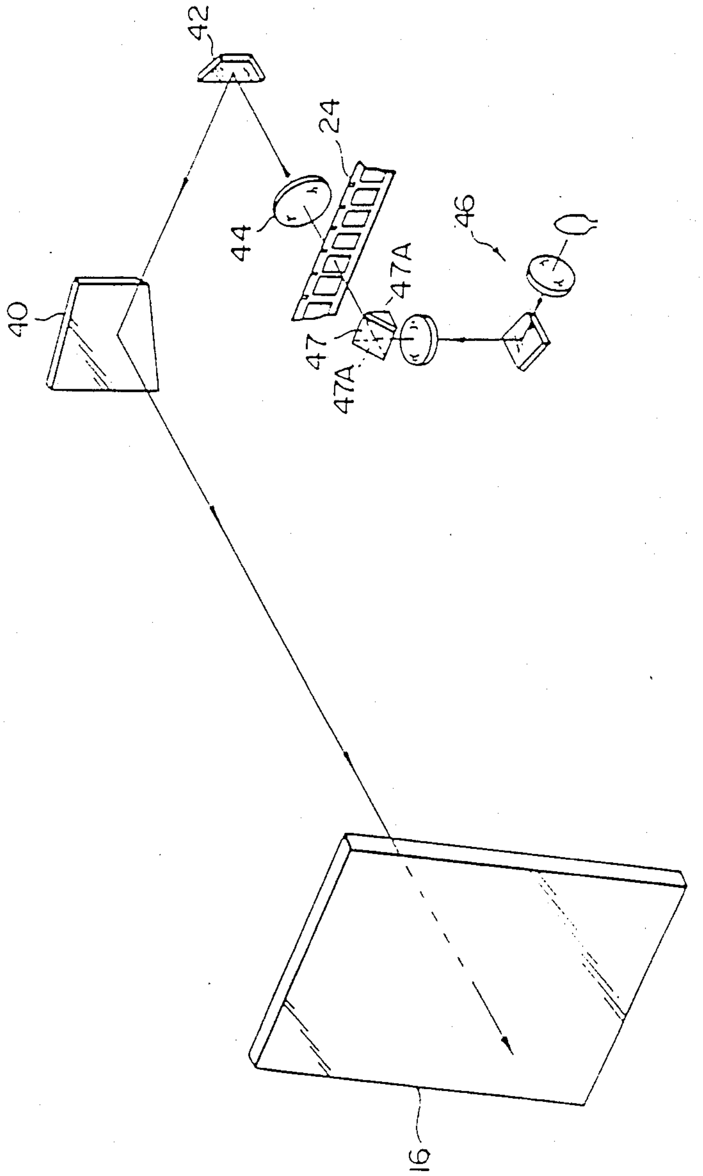
FIG. 3 is a perspective view illustrating the concept of a projecting optical system in the electrophotographic apparatus.

FIGS. 2 to 4 show various optical systems of the electrophotographic apparatus.

Referring first to FIG. 2, the recording optical system includes a document illumination lamp 36 which illuminates a document 34 as a subject which is set on the glass plate 22 of the document table 18 in such a manner that the document surface faces downward, a third mirror 38 on which the light reflected from the document 34 is made incident, a second mirror 40 on which the light reflected from the third mirror 38 is made incident, a first mirror 42 on which the light reflected form the second mirror 40 is made incident, and a main lens 44 for focusing the light reflected from the first mirror 42 on the surface of an electrophotographic film 24.

Referring next to FIG. 3, the projecting optical system includes a projecting light source section 46 for irradiating the electrophotographic film 24, the main lens 44 for focusing the light passing through the film 24 on the first mirror 42, the second mirror 40 on which the light reflected from the first mirror 42 is made incident, and the screen 16 on which the light reflected from the second mirror 40 is projected.

As shown in FIG. 4, the copying optical system includes the projecting light source section 46, the main lens 44, the first mirror 42, the second mirror 40, a conversion lens 48 disposed between the main lens 44 and the first mirror 42 to slightly reduce the optical image formed on the first mirror 42, and a copy mirror 52 adapted to reflect the light reflected from the second mirror 40 toward a sheet of copying paper 30 set on an exposing table 50 disposed in the copying machine 12.

The main lens 44 and the first and second mirrors 42, 40 are mutually used for the above-described three optical system. The main lens 44 and the first mirror 42 are fixedly disposed within the housing portion 14B of the electrophotographic apparatus body 10, while the second mirror 40 is fixedly disposed within the housing portion 14A.

The third mirror 38, the copy mirror 52, the conversion lens 48 and the screen 16 are selectively used. The third mirror 38 and the copy mirror 52 are movably disposed within the housing portion 14A of the apparatus body 10, while the conversion lens 48 is movably disposed within the housing portion 14B so that the lens 48 is prevented from interfering with any other optical system. Since the screen 16 does not interfere with any other optical systems, it is fixedly disposed as described above.

In addition, a shutter (not shown) which is controlled by an automatic exposure controller is disposed between the main lens 44 and the first mirror 42 in the optical systems of the electrophotographic apparatus.

FIGS. 5 to 13 show in combination one embodiment of the processing head according to the present invention which is disposed in the above-described electrophotographic apparatus.

Figure 5:
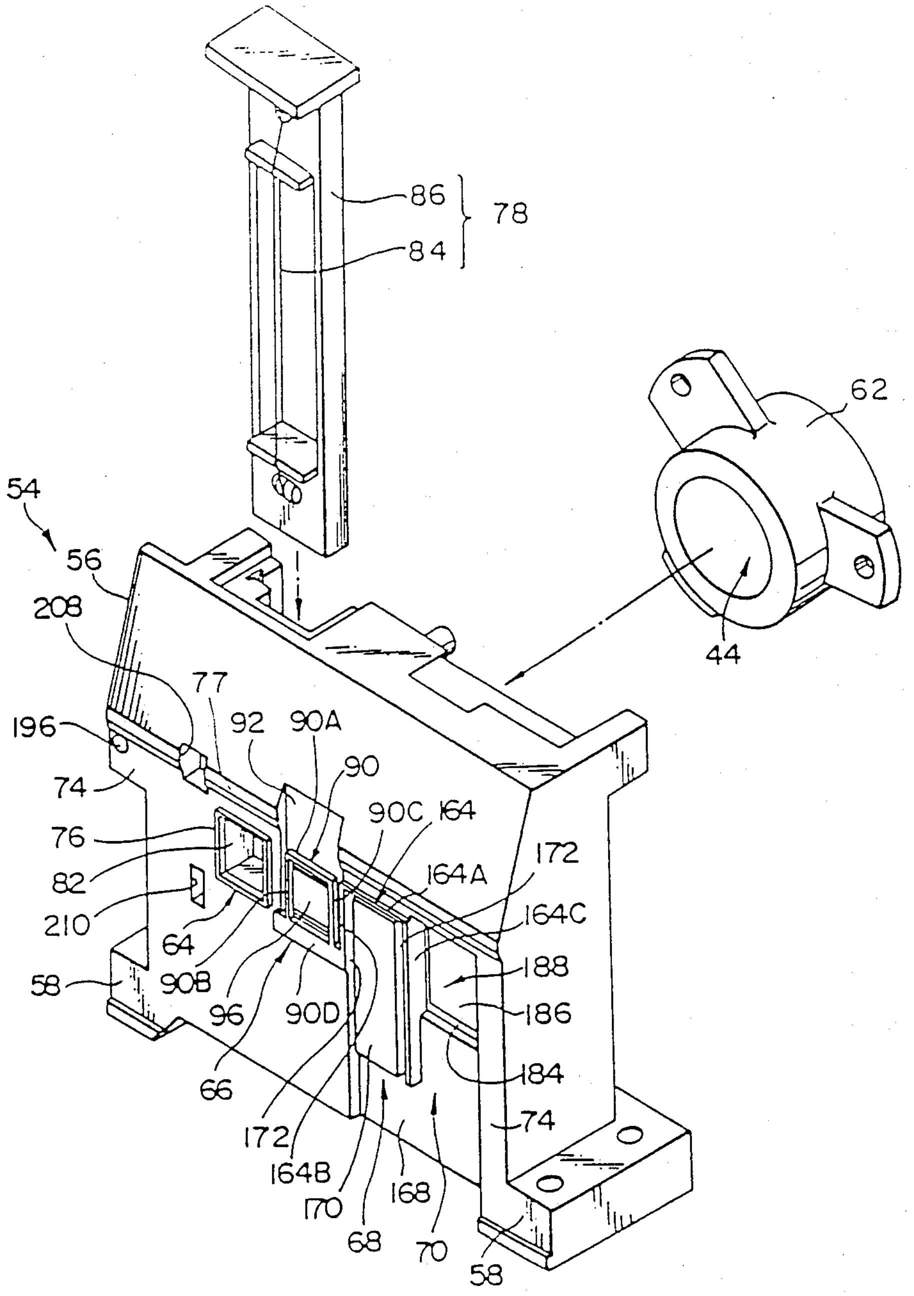
FIG. 5 is an exploded perspective view of a processing head incorporated in the electrophotographic apparatus to which the present invention pertains.
Figure 6:
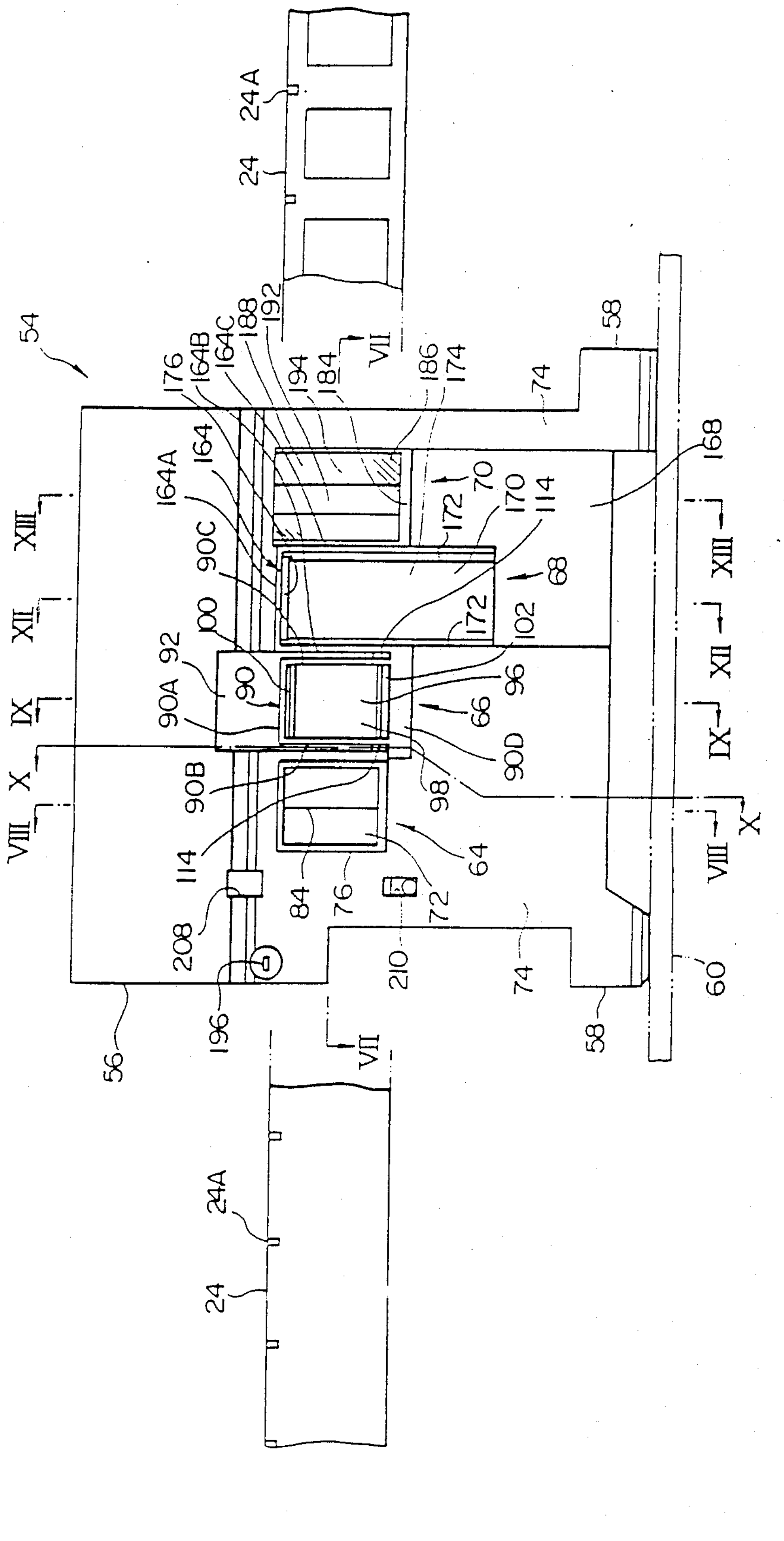
FIG. 6 is a front elevational view of the processing head shown in FIG. 5.

Referring first to FIG. 5 and 6, the processing head 54 has an integral structure which consists of a relatively flat body portion 56 having a substantially rectangular parallelepiped configuration, and a pair of leg portions 58 located below the body portion 56. The processing head 54 is formed form a synthetic resin by an integral molding process except for fitting members. The processing head 54 is disposed between the main lens 44 and the electrophotographic film 24, which are shown in FIGS. 2 to 4, and the leg portions 58 are secured to a frame 60 disposed within the housing portion 14B of the apparatus body 10, as shown in FIG. 6.

Figure 7:
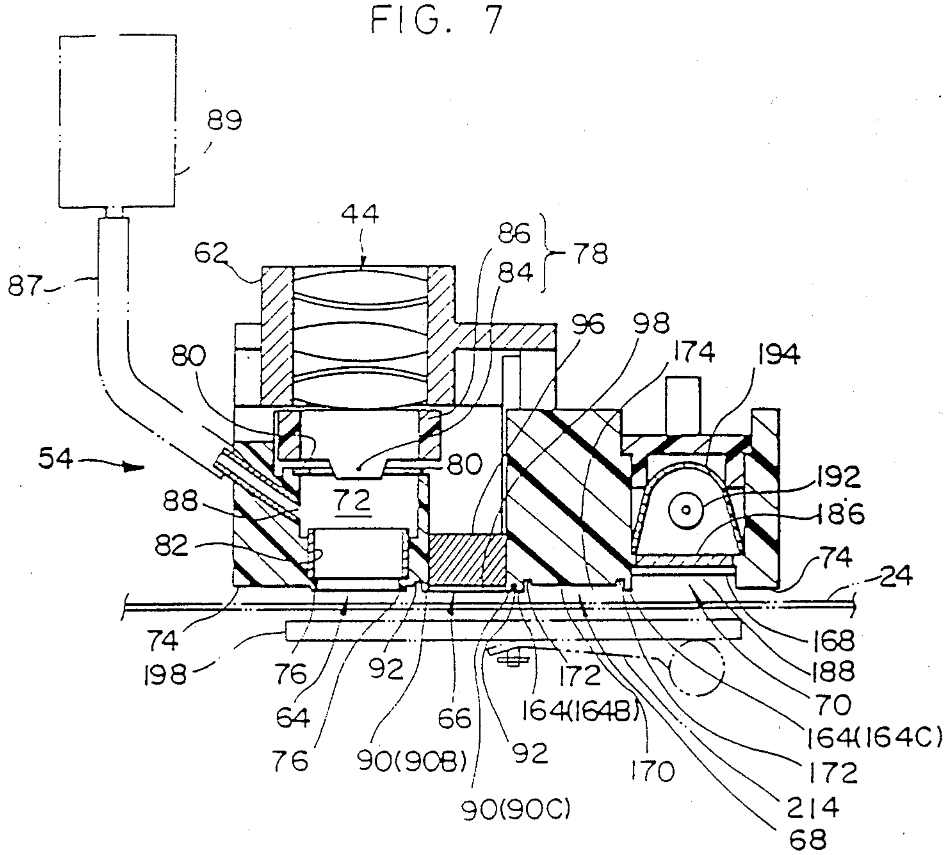
FIG. 7 is a sectional view taken along the line VII—VII in FIG. 6.

The main lens 44 is, as shown in FIGS. 5 and 7, fitted in a lens tube 62 which, in turn, is secured to the rear side of the processing head 54. The electrophotographic film 24 is formed by successively coating a transparent electrically conductive layer, an intermediate layer and a photosensitive layer on a carrier of, e.g., polyethylene. The photosensitive layer consists of a photoconductive layer and a protective layer for protecting the photoconductive layer. This electrophotographic film 24 is formed in the shape of a continuous tape and accommodated in a cassette casing.

Blip marks 24A printed in advance on the upper edge (as viewed in FIG. 6) of the film 24 at a predetermined regular spacing in the longitudinal direction thereof. Each blip mark 24A is provided in correspondence with one frame for an image which is to be recorded on the film 24. The film 24 is disposed in such a manner that the photosensitive layer side thereof faces the front side of the processing head 54, and is movable in the lateral direction (the horizontal direction as viewed in FIG. 6) of the processing head 54 by driving a film moving motor (not shown). The transparent electrical connection with the apparatus body 10 when the cassette is loaded therein. It is a matter of course that any type of known electrophotographic film may be employed in addition to the film of the type described above.

As shown in FIGS. 5 to 7, a charging exposure section 64, a developing section 66, a drying section 68 and a fixing section 70 are successively formed in the body portion 56 of the processing head 54 along the lateral direction thereof at a constant pitch which corresponds to the frame pitch of the film 24.

Figure 8:
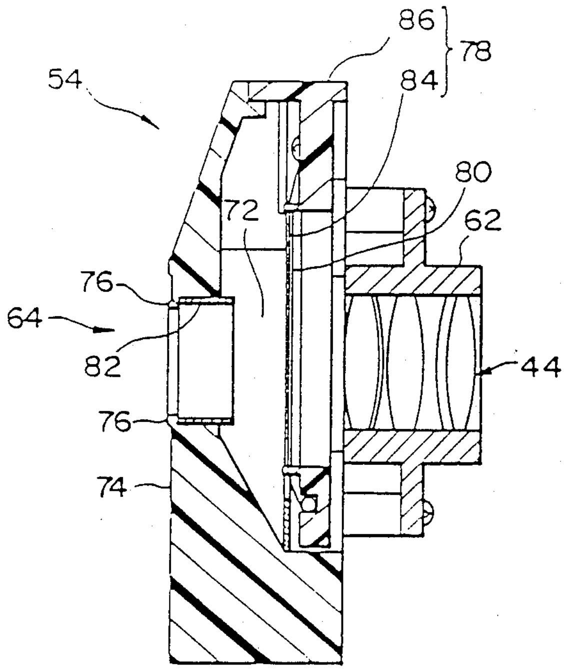
FIG. 8 is a sectional view taken along the line VIII—VIII in FIG. 6.

As shown in FIGS. 7 and 8, the charging exposure section 64 has a charging exposure chamber 72 which is defined by an internal space provided on the reverse side of a front wall 74 of the processing head 54. The chamber 72 is communicated with an opening provided in the front wall 74 of the head 54. As also shown in FIGS. 5 and 6, a mask 76 is formed along the peripheral edge of the opening in the front wall 74, the mask 76 slightly projecting from the surface of the front wall 74. The mask 76 defines a rectangular opening the size of which corresponds to one frame of the film 24. In the charging exposure chamber 72 are disposed a corona unit 78, proximity electrodes 80 and a mask electrode 82.

As shown in FIG. 5, the corona unit 78 consists of a corona wire 84 and a holder 86 made of a synthetic resin and adapted to hold the corona wire 84, the unit 78 being inserted into the processing head 54 from the upper side thereof. The proximity electrodes 80 are respectively defined by relatively narrow metal plates and disposed on both sides of the corona wire 84. The mask electrode 82 is formed by bending a metal plate in a square shape, and disposed in the vicinity of the opening in the front wall 74. The corona wire 84 is connected to a high-voltage power supply, while the proximity electrodes 80 and the mask electrode 82 are electrically connected to each other. In general, the proximity electrodes 80 are connected directly to the ground, while the mask electrode 82 is connected to the ground through an electrical resistance. However, bias voltages which are different from each other may be respectively applied to the proximity and mask electrodes 80 and 82 from an external power supply.

As shown in FIG. 7, a film cooling air inlet 88 is opened into the charging exposure chamber 72 so that cold air is supplied to the chamber 72 with an air pump 89 through a pipe 87. The main lens 44, which is mounted on the rear side of the processing head 54 through the lens tube 62, has the optical axis thereof made coincident with the center of the opening defined by the mask 76.

The charging/exposure section 64 has a transversely-extending guide projection 77. The guide projection 77 has the same height as the mask 76 and is intended for preventing, when the electrophotographic film 24 is set in the cassette loading section 26 together with the cassette, the electrophotographic film 24 from being caught by the mask 76 on the front wall 74 of the main part 56 of the processing head 56. To this end, the surfaces on the upper and lower sides are tapered such as to progressively decrease the height.

As shown in FIGS. 5 and 6, the developing section 66 has a mask 90. The mask 90 is defined by an upper frame member 90A, left and right frame members 90B, 90C, and a lower frame member 90D. The upper frame members 90A and the left right frame member 90B and 90C rise from the surface of a recess 92 formed in the front wall 74, and the lower frame member 90D rises from the front wall 74. Both longitudinal end portions of the lower frame member 90D project horizontally from the joints between the frame member 90D and the left and right frame members 90B and 90C. The amount by which the mask 90 projects is set so that the mask 90 is flush with the mask 76.

The width of the opening defined by the mask 90 is set such as to be slightly smaller than that of the opening defined by the mask 76. The height of the opening defined by the mask 90, that is, the distance between the respective inner walls of the upper and lower frame members 90A and 90D, is set such as to be larger than that of the opening defined by the mask 76 since the inner wall of the lower frame member 90D is positioned lower than that of the mask 76.

Figure 9:
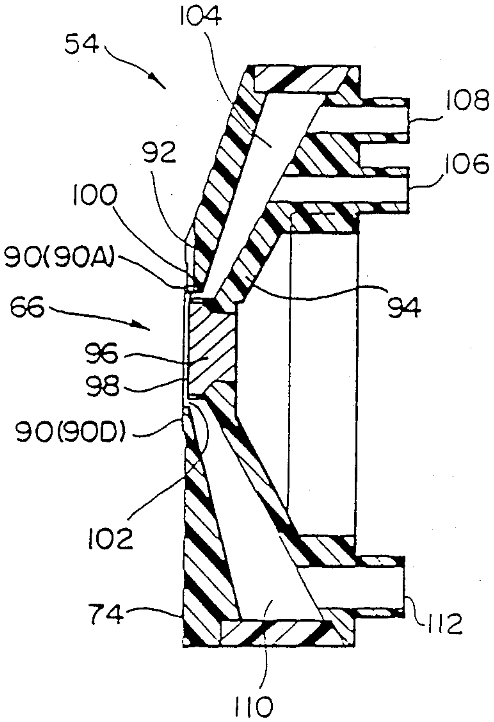
FIG. 9 is a sectional view taken along the line IX—IX in FIG. 6.

As shown in FIG. 9, a developing electrode 96 is disposed within the opening defined by he mask 90, the electrode 96 being supported by a rear wall 94. The developing electrode 96 is connected to a bias power supply. The developing electrode 96 is positioned in such a manner that the outer surface thereof is located at a position which is slightly inner than the end face of the mask 90. The space surrounded by the developing electrode 96 and the inner walls of the mask 90 defines a developing chamber 98. An opening is provided between the upper edge of the electrode 96 and the mask 90 to define a developer and squeezing air inlet 100, and another opening is provided between the lower edge of the electrode 96 and the mask 90 to define a developer and squeezing air inlet 100 is communicated with a passage 104 which is defined by a space inside the processing head 54. The passage 104 is communicated with a developer supply port 106 and a squeezing air supply port 108, which are provided in the rear side of the processing head 54. The developer and squeezing air outlet 102 is communicated with a passage 110 defined by a space inside the processing head 54. The passage 110 is communicated with a developer and squeezing air discharge port 112 which is provided in the rear side of the processing head 54.

Figure 10:
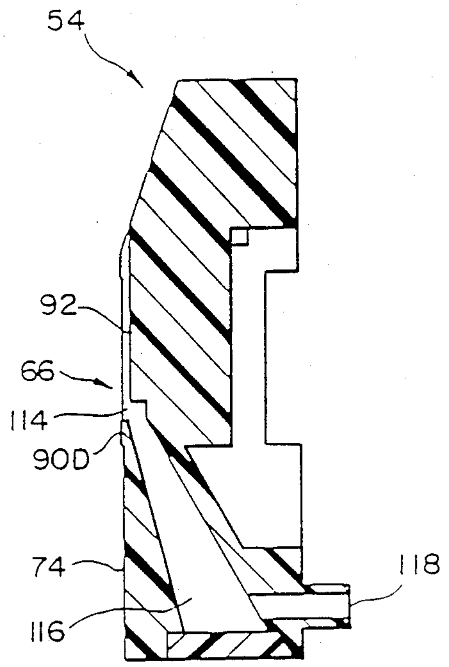
FIG. 10 is a sectional view taken along the line X—X of FIG. 6.

Recesses 92 are respectively provided on the outer sides of the left and right frame members 90B and 90C of the mask 90. As shown in FIGS. 6 and 10, a squeezing suction port 114 is provided at the lower end of each of the recesses 92. The suction ports 114 are, as shown in FIG. 10, communicated with a passage 116 which is defined by a space inside the processing head 54. The passage 116 is communicated with a suction squeeze opening 118 provided in the rear side of the processing head 54.

Figures 11A, 11B:
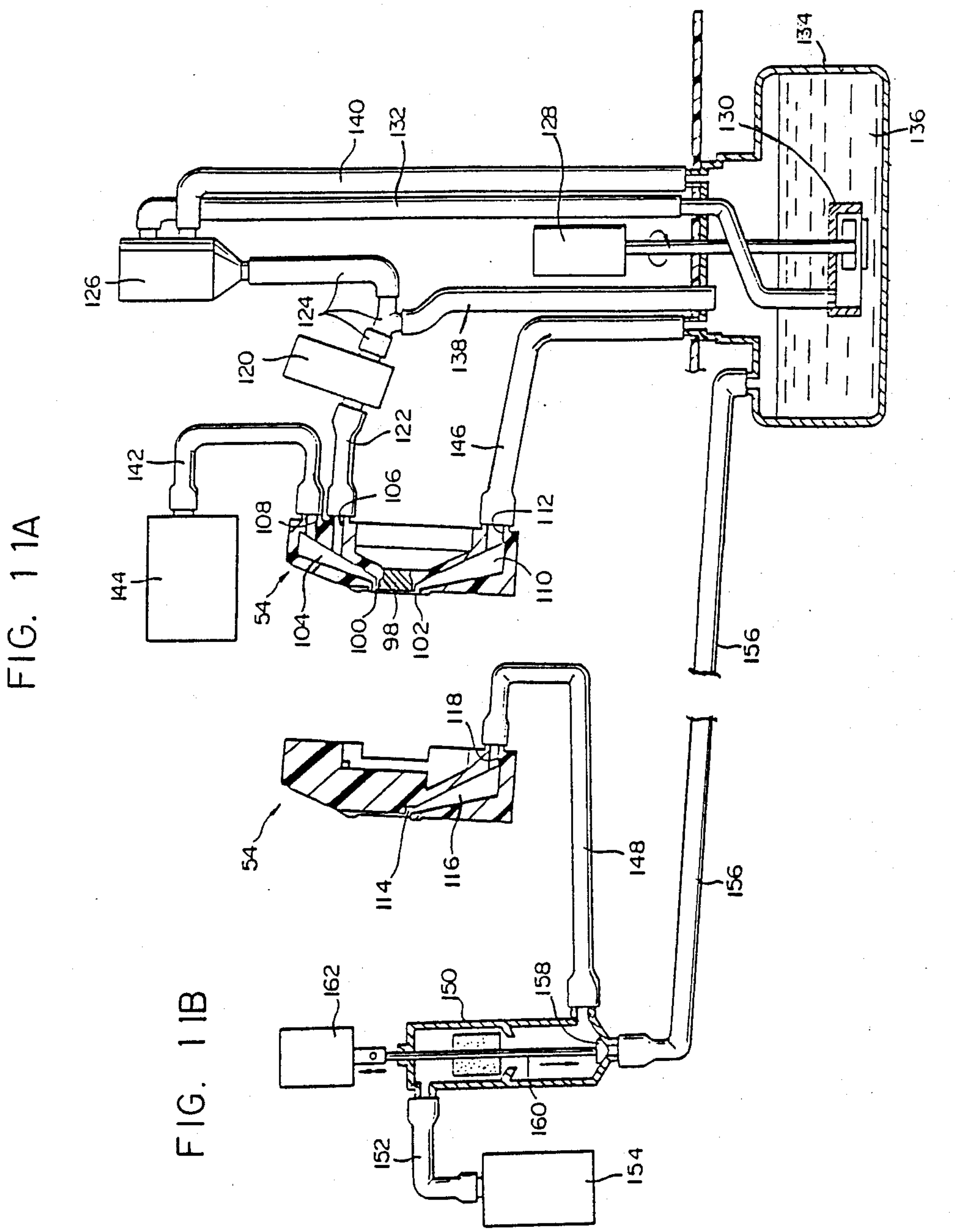
FIGS. 11A and 11B are illustrations of a developing section in the processing head in relation to other devices.

Referring to FIG. 11(A), the developer supply port 106 is connected to a developer tank 126 through pipes 122 and 124 via a solenoid valve 120. The developer tank 126 is positioned at a level above the solenoid valve 120. A developer pump 130 adapted to be driven by a motor 128 is connected to the developer tank 126 through a pipe 132. The developer pump 130 is disposed in a developer bottle 134 which is charged with a developer 136 formed by toner particles dispersed in a solvent. A return pipe 138 leading to the developer bottle 134 branches from an intermediate pipe 124 between the solenoid valve 120 and the developer tank 126. A return pipe 140 opening to the developer bottle 134 is connected to the developer tank 126.

The squeezing air supply port 108 is connected to a pressure squeezing air pump 144 through a pipe 142. The developer and squeezing air discharge port 112 is connected with a return pope 146 which opens into the developer bottle 134.

As shown in FIG. 11(8), the suction squeeze opening 118 is connected to a suction trap 150 through a pipe 148. The suction trap 150 is connected to a suction squeezing air pump 154 through a pipe 152. A return pipe 156 which opens into the developer bottle 134 is connected to the bottom of the suction trap 150. A valve 158 which is able to close the return pope 156 is disposed at the joint between the suction trap 150 and the return pope 156. The valve 158 is moved vertically by the action of solenoid 162 through a shaft 160.

It should be noted that, as shown in FIG. 11, the processing head 54 is inclined with respect to the horizontal plane so that the optical axis of each of the optical systems is perpendicular to the surface of the screen 16 which is slanted.

Referring to FIGS. 5 and 6, the drying section 68 has a frame 164. The frame 164 consists of an upper frame member 164A and left and right frame members 164B and 164C and has no lower frame member. The left frame member 164B is contiguous with the right-hand end portion of the lower frame member 90D of the mask 90 and rises from the front wall 74 together with the upper frame member 164A. The right frame member 164C rises from a recess 168 which is depressed from the front wall 74 in the shape of a step.

Figure 12:
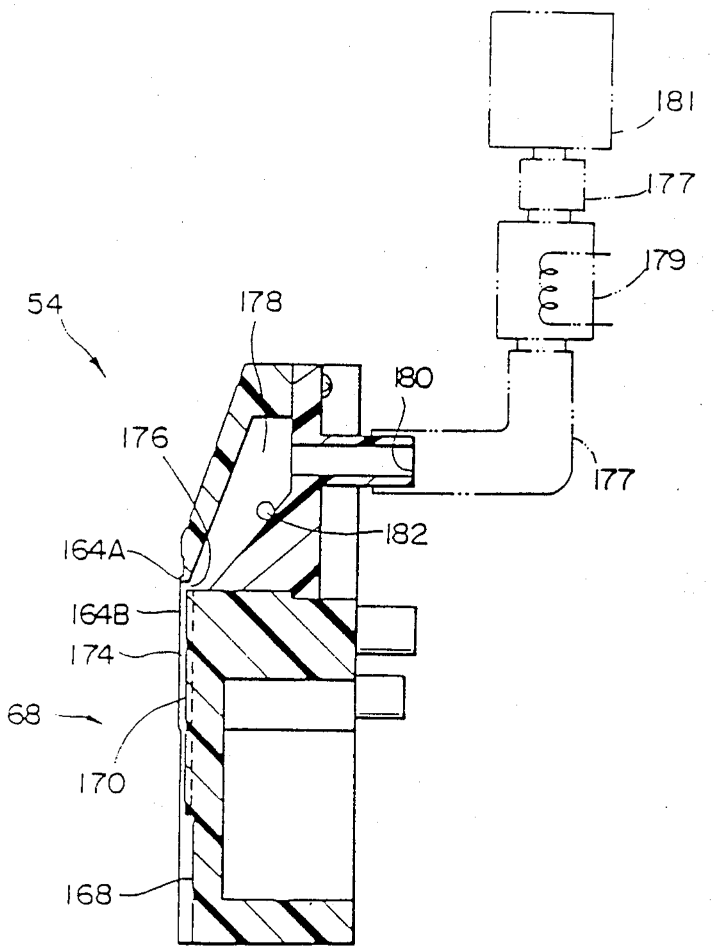
FIG. 12 is a sectional view taken along the line XII—XII of FIG. 6.

As shown in FIGS. 7 and 12, a wall 170 is formed between the left and right frame members 164B and 164C in such a manner that the surface of the wall 170 is located at a position which is slightly inner than the end face of the frame 164. In addition, recesses 172 are formed on both sides of the wall 170. The bottom surface of each recess 172 is raised from the wall surface of the recess 168 in the front wall 74. The space surrounded by the frame 164, the wall 170, and the recesses 172 defines a drying chamber 174. The distance between the opposing lateral inner surfaces of the frame 164 is set such as to be larger than the width of the opening defined by the mask 90. In addition, the lower surface (the frame inner surface) of the upper frame member 164A is positioned above that of the mask 90 in the developing section 66.

As shown in FIGS. 6 and 12, the lower portion of the upper frame member 164A is cut in the shape of a slit along the longitudinal direction of the frame member 164A, thereby providing a warm air outlet 176. The warm air outlet 176 is, as shown in FIG. 12, communicated with a passage 178 which is defined by a space inside the processing head 54. The passage 178 is communicated with a warm air supply port 180 which is provided in the rear side of the processing head 54. A temperature sensor 182 is disposed in the passage 178. The warm air supply port 180 is connected to a heater 179 and an air pump 181 through a pipe 177.

The fixing section 70 is, as shown in FIGS. 5 to 7, defined between the right frame member 164C of the frame 164 and the right-hand end portion of the front wall 74. The fixing section 70 has a frame 184 which consists of a lower frame member and left and right frame members, the frame 184 being located at a position which is further depressed from the recess 168 in the front wall 74. A transparent glass plate 186 is fitted in the frame 184. The space provided on the front side of the glass plate 186 defines a fixing chamber 188.

Figure 13:
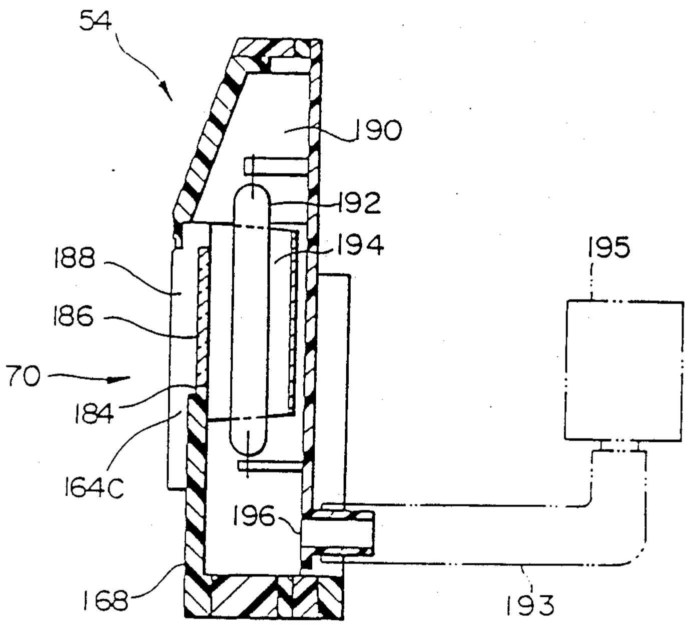
FIG. 13 is a sectional view taken along the line XIII—XIII of FIG. 6.

As shown in FIG. 13, a xenon lamp 192 and a reflecting plate 194 are disposed within a space 190 inside the processing head 54 which is provided on the reverse side of the glass plate 186. A cooling air inlet 196 opens into the space 190 so that cold air is supplied to the space 190 from an air pump 195 through a pipe 193. The space 190 and the fixing chamber 188 are communicated with each other through the area defined at the upper edge of the glass plate 186.

Referring to FIGS. 5 and 6, the processing head 54 has a blip sensor 196 which is disposed on the left-hand end portion of the front wall 74. The blip sensor 196 is located at a position at which the blip marks 24A printed on the electrophotographic film 24 pass, the film 24 being moved along the front side of the processing head 54. Thus, when each blip mark 24A passes, the blip sensor 196 detects interception of the light from a light source for the sensor 196 which is disposed in opposing relation to the sensor 196 across the film 24.

Figure 14:
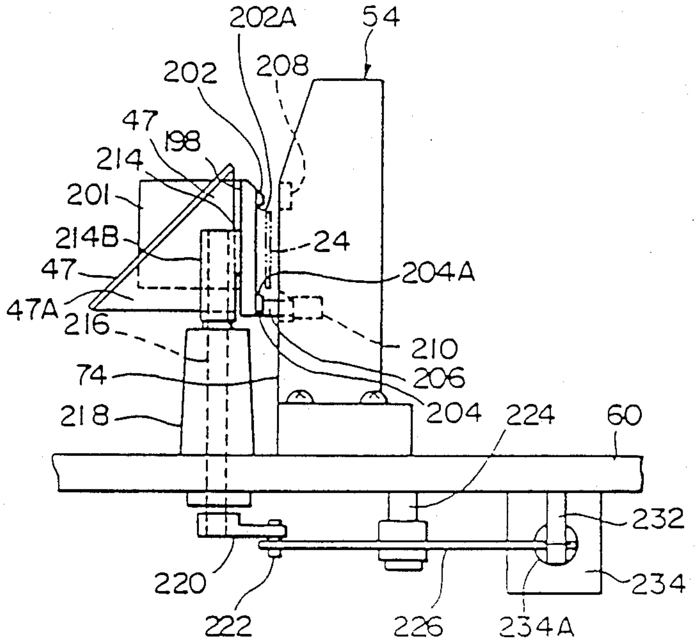
FIG. 14 is a schematic side elevational view of an essential portion of the present invention, illustrating the positional relationship between the processing head and a pressing plate.
Figure 15A:
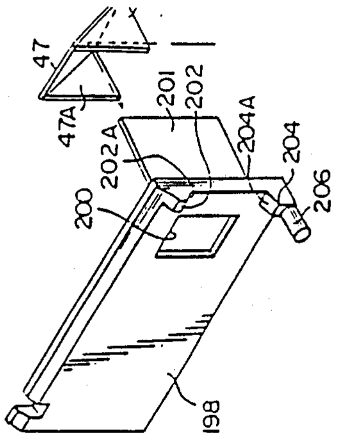
FIG. 15A is a perspective view of a portion of the film pressing mechanism as seen from the opposite side to FIG. 15.
Figure 15:
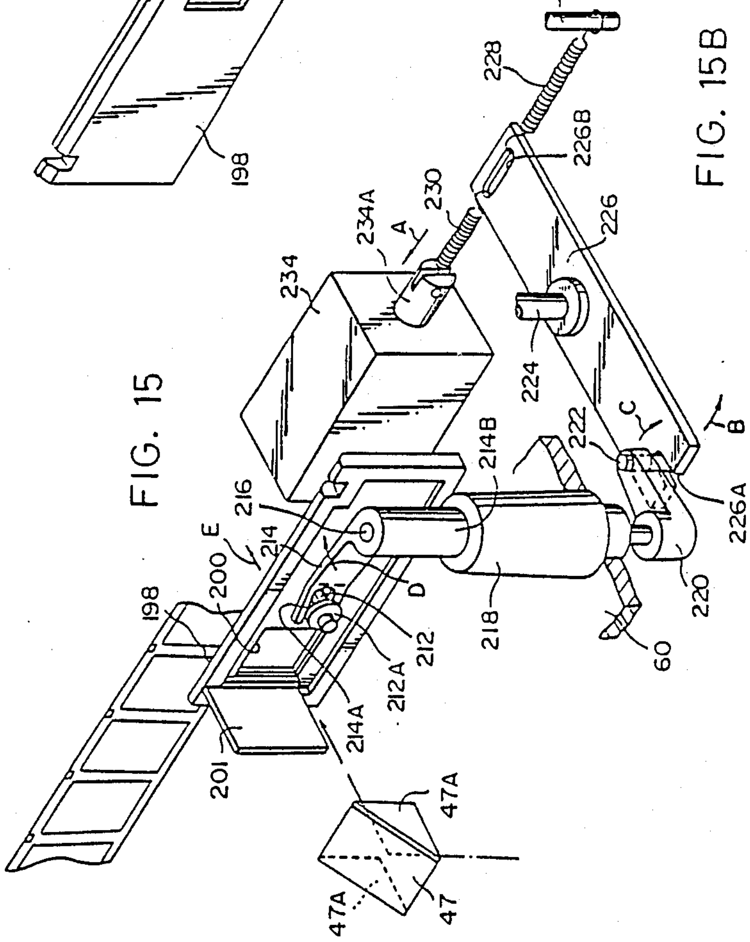
FIG. 15 is a perspective view of a film pressing mechanism provided on the processing head.

As shown in FIGS. 7 and 14, a pressing plate 198 serving as the film pressing means is disposed in front of the front wall 74 of the processing head 54. The pressing plate 198 in, as shown in FIG. 15, is provided with a rectangular through-hole 200 which is a size smaller than the opening defined by the mask 76 formed in the charging exposure section 64. The pressing plate 198 is disposed in such a manner that the through-hole 200 opposes the mask 76.

A light-shielding plate 201 is secured to the pressing plate 198 and is disposed at one side of the through-hole 200. The light-shielding plate 201 is made of a thin sheet material which is orthogonally bent at its one end so as to provide a flap portion which is secured to the reverse side of the pressing plate 198 by, for example, an adhesive. The use of the adhesive, however, is not exclusive and the light-shielding plate 201 may be secured to the pressing plate by means of small screws or the light-shielding plate 201 may be formed integrally with the pressing plate 198.

In operation, the light from the projecting light source 46 (see FIG. 3) is applied to a frame on the electrophotographic film 24 from the rear side of the pressing plate 198 via the through hole 200 as indicated by an arrow E of FIG. 15. This projecting light, however, cannot reach the frame on one side of the frame to be exposed, because any portion of the light heading for these frames is intercepted by the light-shielding plate 201 provided at one side of the through-hole 200. It will be seen that the other adjacent frame, i.e., the frame on the other side of the frame to be exposed, is sufficiently shielded from the light because this frame faces substantial portion of the pressing plate 198 devoid of the through-hole 200 which is formed adjacent to one longitudinal end of the pressing plate 198.

Figure 15B:
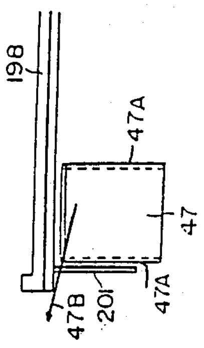
FIG. 15B is a plan view illustrating the positional relationship between a light shielding plate and a mirror side plate.

In order to ensure that the frames adjacent to the frame to be exposed are shielded from the projecting light, it is advisable to provide side panels 47A on both sides of a reflection mirror 47 incorporated in the projecting light source section 46 and adapted for directing the projecting light towards the electrophotographic film 24. The light from the projecting light source section 46 is directed vertically upwardly and is then reflected by the mirror 47 which is inclined at about 45°, so as to impinge upon the frame to be exposed through the through-hole 200. The above-mentioned side plates 47A, which in this case have a triangular form, are secured to both lateral sides of the reflection mirror 47A so as to overlap the light-shielding plate 201 as shown in FIG. 15B, whereby undesirable exposure as indicated by an arrow 47B is avoided without fail.

The pressing plate 198 has a column portion 212 projecting from the reverse surface thereof, that is, the surface thereof which is remote from the processing head 54.

This column portion 212 is engaged with a notched portion 14A formed at one end portion of an arm 214. A stop ring 212A is rigidly, secured to the distal end portion of the column portion 212 so as to prevent the notched portion 214A from coming off the column portion 212. A boss portion 214B. is formed at the other end of the arm 214. A shaft 216 is rigidly secured to the boss portion 214B.

The shaft 216 is rotatably fitted into and thereby supported by a stand 218 projecting from the frame 60 to which the processing head 54 is secured, the lower end portion of the shaft 216 projecting from the reverse surface of the frame 60. A first lever 220 is rigidly secured to the projecting lower end portion of the shaft 216. A pin 222 is rigidly secured to the distal end portion of the first lever 220.

A shaft 224 is suspended from the reverse side of the frame 60. The shaft 224 pivotally supports the intermediate portion of a second lever 226. A notched portion 226A is formed at one end of the second lever 226, and the pin 222 is engaged with the notched portion 226A. A slot 226B is formed in the other end portion of the second lever 226, and one end portion of each of the tension coil springs 228 and 230 is retained by the slot 226B, the springs 228 and 230 biasing the second lever 226 in the opposite directions to each other so as to support the lever 226 resiliently.

The other end portion of the tension coil spring 228 is retained by a pin 232 suspended from the reverse side of the frame 60, while the other end portion of the tension coil spring 230 is retained by a plunger 234A of a pull-type solenoid 234 which is secured to the reverse side of the frame 60.

When the solenoid 234 is not energized, the pressing plate 198 is separated from the processing head 54. In this state, the pressing,. plate 198 is supported in such a manner that the column portion 206 is fitted into the bore 210 as shown in FIG. 14.

When the solenoid 234 is energized, the plunger 234A is activated to move in the direction of the arrow A in FIG. 15, causing the tension coil springs 228 and 230 to be expanded against the biasing forces. In consequence, the second lever 226 is pivoted about the shaft 224 in the direction of the arrow B, so that the first lever 220 is pivoted about the pin 222 in the direction of the arrow C, thus causing the shaft 216 to turn in the same direction. Thus, the arm 214 is pivoted in the direction of the arrow D so to press the pressing plate 198 in the direction of the arrow E.

When the solenoid 234 is de-energized, the second lever 226, which is subjected to the biasing force from the spring 228, is pivoted counter to the direction of the arrow B. In consequence, the arm 214 is pivoted counter to the direction of the arrow D, so that the notched portion 214A presses the stop ring 212A, causing the pressing the plate 198 to move counter to the direction of the arrow E.

Figure 17:
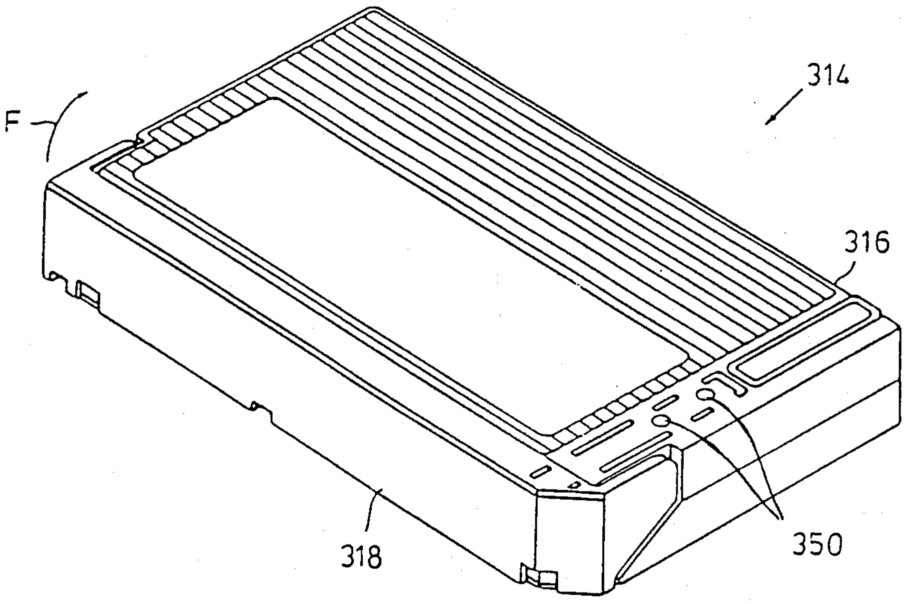
FIG. 17 is a perspective view of a cassette used in the electrophotographic apparatus.
Figure 18:
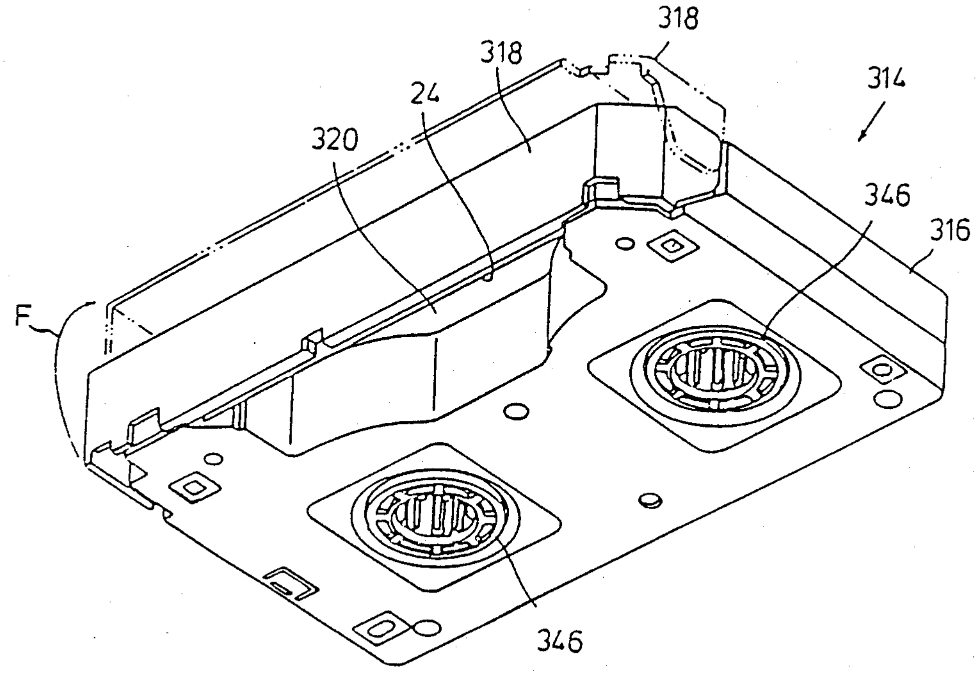
FIG. 18 is a perspective view of the cassette as seen from the reverse side of the cassette shown in FIG. 3.

In the cassette 314, a guard panel 318 is disposed at the front side of a cassette case 316, as shown in FIGS. 17 and 18. The guard panel 318 is supported at both the side-ends thereof to the cassette case 316 rotatably in the direction of the arrow F and counter to the direction of the arrow F. It is to be noted that the guard panel 318 is being biased counter to the direction of the arrow F by such a biasing means as a spring (not shown). As shown in FIG. 18, a recess portion 320 opened toward the front and reverse sides is formed in the cassette case 316. Both the end portions of the electrophotographic film 24 are retained on a pair of reels 346 disposed in the cassette case 316 and the film 24 is wound thereon. An intermediate portion of the electrophotographic film 24 travels across the recess portion 320. In case that the guard panel 318 is opened (rotated) in the direction of the arrow F, the portion of the electrophotographic film 24 positioned in the recess portion 320 is exposed from the front side of the cassette case 316. It is to be noted that two contact members 350 (see FIG. 17) are connected electrically to the electrophotographic film 24 accommodated in the cassette case 316. In the course of loading the cassette 314 in the cassette loading section 26, the guard panel 318 is opened (rotated) up to the position shown with a dotted line in FIG. 18.

In the loaded situation of the cassette 314, therefore, the portion of the electrophotographic film 24 positioned in the recess portion 320 is exposed at the front side of the cassette case 316. In the loading situation, also, the pressing plate 198 is positioned in the recess portion 320 and the portion of the electrophotographic film 24 positioned in the recess portion 320 is positioned in a clearance formed between the processing head 54 and the pressing plate 198.

The following is a description of the operation of this embodiment.

The electrophotographic apparatus is arranged such that, when the power supply switch is turned ON, the cassette loading section 26 (shown in FIG. 1) is raised, thereby allowing a cassette accommodating the electrophotographic film 24 to be loaded into the section 26. After the cassette 314 has been loaded into the cassette loading section 26, the operator pushes down the section 26 to the initial position by a manual operation. In consequence, the cassette loading section 26 is locked at said position. In this state, the film 24 is positioned as shown in FIG. 14 and is allowed to move along the front side of the processing head 54 by the operation of a film moving motor (not shown).

When the image of the document 34 (shown in FIG. 2) is to be recorded on the film 24, the film moving motor is activated to move the film 24 in such a manner that a given frame which is selected from the unexposed frames as desired is positioned in from of the mask 76 in the charging exposure section 64. This operation is executed by designating a desired frame through the control keyboard 28 shown in FIG. 1. The positioning of the selected frame with respect to the charging exposure section 64 is effected by virtue of the blip sensor 196 which counts the number of blip marks 24A from a reference point.

Figure 16:
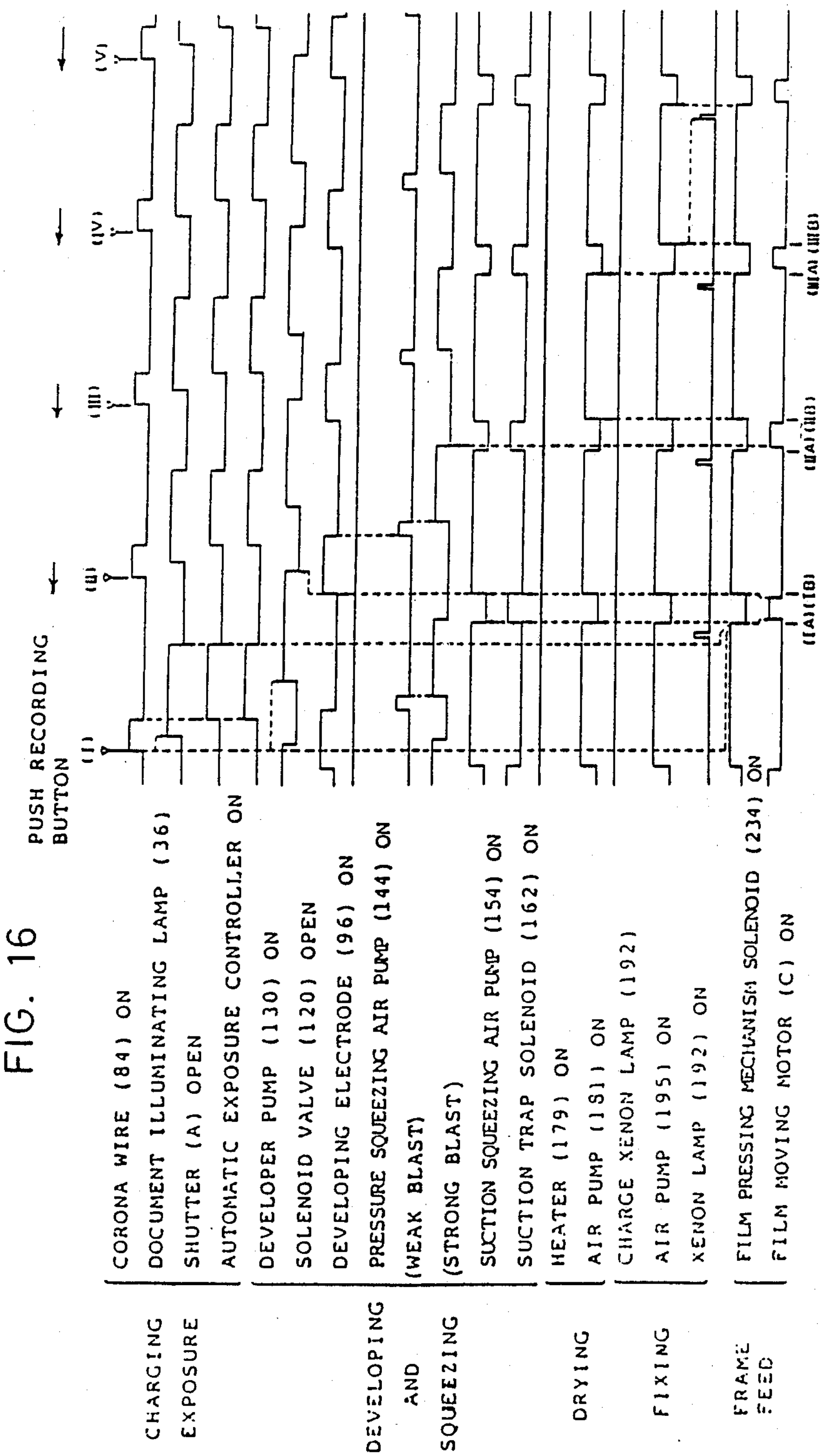
FIG. 16 is a time chart showing the operation of the electrophotographic apparatus in camera mode.

FIG. 16 is a time chart showing the operation of the apparatus in the case where a given frame is positioned as described above and subjected to recording and, subsequently, continuous recording is effected on each of the frames which consecutively follow the first recorded frame. In the processing head 54, when the frame positioned at the charging exposure section 64 is being subjected to charging and exposure operations, frames which are respectively positioned at the developing section 66, the drying section 68 and the fixing section 70 are simultaneously subjected to different kinds of processing, respectively. However, the following description will be made about only one frame which is to be subjected to recording when the recording button is pressed at the position (I) in FIG. 16 to start recording.

Recording of the document 34 is made possible by selecting the camera mode through the control keyboard 28. Simultaneously with this mode selecting operation, a bias voltage is applied to the developing electrode 96 in the developing section 66, the heater 179 for heating air sent to the drying chamber 174 is energized so as to generate heat, and a capacitor for the xenon lamp 192 in the fixing section 70 is supplied with current so as to be charged. These operations are continued while the camera mode is being selected.

When the recording button on the control keyboard 28 is pressed, a high voltage is applied to the corona wire 84 in the charging exposure section 64, causing a corona discharge to occur between the corona wire 84 on one hand and the proximity and mask electrodes 80 and 82 on the other. Thus, the surface of the photosensitive layer of a portion of the film 24 which is positioned within the opening defined by the mask 76 is charged positive.

At the time when the recording button is pressed, the solenoid 234 in the film pressing mechanism has continuously been excited from the previous step. Therefore, the film 24 is pressed by the pressing plate 198 so be in pressure contact with the respective end faces of the masks 76, 90 and the frame 164 of the processing head 54. The pressing plate 198 has the through-hole 200 formed in a portion thereof which opposes the mask 76, but this through-hole 200 is smaller than the opening defined by the mask 76. Therefore a portion of the film 24 which is positioned at the end face of the mask 76 is pressed by the surface of a portion of the pressing plate 198 around the through-hole 200. Accordingly, the film 24 is reliably brought into close contact with the end face of the mask 76, and the charging range is thereby accurately limited within the opening in the mask 76.

Since the mask electrode 82 provided in the charging-/exposure chamber 72 is maintained at a potential substantially equal to the potential of the charged film 24, the peripheral edge portion of a frame of the film 24 which is positioned at the opening in the mask 76 is also charged at a value close to the potential at the central portion of said frame, thus enabling the whole of a frame of the film 24 to be uniformly charged. The mask electrode 82 can be maintained at a potential substantially equal to the potential of the charged film 24 by appropriately selecting the value of a resistor (not shown) electrically connected between the ground and the mask electrode 82, or by applying a bias voltage to the mask electrode 82 from an external power supply (not shown).

The document illuminating lamp 36 is turned ON when a predetermined period of time has elapsed after the recording button has been pressed at the position (I) in FIG. 16, so as to illuminate the document 34 placed on the glass plate 22 of the document table 18. Further, when a predetermined period of time has elapsed after the recording button has been pressed, the supply of current to the corona wire 84 is suspended, thus completing the corona discharge operation.

At the same time as the suspension of the energization of the corona wire 84, a shutter (not shown but indicated by the reference symbol A in FIG. 16) is opened, and the light reflected from the document 34 placed on the document table 18 is applied to the film 24 by the optical system shown in FIG. 2. In addition, the automatic exposure controller (not shown but indicated by the reference symbol B in FIG. 16) simultaneously starts integration of the quantity of light.

On the other hand, when a predetermined period of time has elapsed after the recording button has been pressed, the motor 128 shown in FIG. 11 (A) is activated to start the operation of the developer pump 130, whereby the developer 136 in the developer bottle 134 is pumped up into the developer tank 126. The developer 136 thus pumped falls from the developer tank 126 by the force of gravity towards the processing head 54 through the pipe 124. In this state, however, the solenoid valve 120 is still kept closed so that the developer 136 is returned to the developer bottle 134 via the return pipe 138. When the level of the developer 136 in the developer tank 126 is raised to a predetermined limit, the developer 136 is returned to the developer bottle 134 through the return pipe 140.

The flow of the excess developer through the return pipe 140 is detected by the detector 163B which delivers a signal for reducing the voltage of the power supplied to the motor 128, thereby reducing the rate of supply of the developer. Conversely, if the returning of the excessive developer through the return pipe 140 is not detected by the detector 163B even after lapse of the above-mentioned predetermined period of time after the start of the motor 128, the voltage of the power supplied to the motor 128 is increased. It will be seen that a predetermined quantity of developer is stored in the developer tank 126 through the described control of the motor 128.

Thus, the developer 136 is circulated between the developer bottle 134 and the developer tank 126 and is stopped at the upstream side of the solenoid valve 120 until the solenoid valve 120 is opened. This recirculation produces an appreciable stirring effect on the developer 36 in the developer bottle 134.

When the integrated value of the quantity of light reaches a set value, the integration effected by the automatic exposure controller (B) is suspended and, at the same time, the shutter (A) is closed, and the document illuminating lamp 36 is turned OFF. At this point of time, the exposure step is completed and, one frame of the film 24 in a portion thereof which is positioned at the opening defined by the mask 76 has an electrostatic latent image formed thereon owing to the fact that the electric charge on the photosensitive layer is reduced in accordance with the image pattern on the document 34. Since factors in changes of the image density, such as variations in the ground density of the document 34 and variations in the voltage applied to the document illuminating lamp 36, are corrected by the automatic exposure controller (B), an optimal exposure operation is effected at all times. When a predetermined period of time has elapsed after the recording button had been pressed and all the steps of processing other frames have already been completed, the solenoid 234 of the film pressing mechanism is immediately de-energized. When the solenoid 234 is de-energized at the position (IA) in FIG. 16, the pressing plate 198 is separated form the film 24.

When a predetermined period of time has elapsed after de-energization of the solenoid 234 of the film pressing mechanism, the film moving motor (not shown but indicated at C in FIG. 16) is started so as to effect a one-frame feed of the photographic film 24 rightward as viewed in FIG. 6. In consequence, the frame which has been positioned in the charging/exposure section 64 is moved to the developing section 66. The feed of the electrophotographic film 24 is controlled in accordance with the signal from the blip sensor 196 capable of sensing the blip mark 24A so that the amount of feed precisely coincides with the pitch of the frame, as explained before.

When a predetermined time has elapsed after the stop of the film moving motor C, the solenoid 234 of the film pressing mechanism is energized at a moment (IB) in FIG. 16, thereby causing the pressing plate 198 to press the electrophotographic film 24 onto the processing head 54. At the same time, suction through the suction squeeze opening 118 is commenced and the solenoid valve 120 is opened.

When the solenoid valve 120 is opened, the developer 136 is allowed to reach the processing head 54 through the pipe 122, and the developer 136 then flows into the developing chamber 98 from the developer and squeezing air inlet 100 in the developing section 66. Since the toner particles dispersed in the developer 136 are charged negative, the toner particles, when flowing down through the developing chamber 98, adhere to portions of the film 24 which are charged positive, thereby developing the electrostatic latent image. The developer 136 having flowed down through the developing chamber 98 is returned to the developer bottle 134 from the developer and squeezing air outlet 102 through the return pipe 146.

The diameters of the pipes and other parameters of the developer supply system are so determined that the developer supplied from the developer tank 126 to the pipe 124 is partially returned to the developer bottle 134 through the return pipe 138, while the remainder part of the developer is directed to the solenoid valve 120.

Since the electrophotographic film 24 is pressed by the pressing plate 198 onto the end surface of the mask 90, there is no risk for the developer 136 flowing down through the developing chamber 98 to come into the gap between the end surface of the mask 90 and the electrophotographic film 24. Any portion of the developer 136 which has come into this gap is sucked and trapped by vacuum which is generated in recesses 92 on both sides of the left and right frames 90B, 90C of the mask by the operation of a suction pump (not shown).

When a predetermined period of time has elapsed after opening of the solenoid valve 120, the solenoid valve 120 is closed so as to stop the supply of the developer 136 to the developing chamber 98. At the same time, the pressure-squeezing air pump 144 is started so that pressurized air is supplied into the developing chamber 98 through the developer/squeeze air inlet 100. thereby blowing any excessive developer 136 off the electrophotographic film 24. The developer 136 thus blown off the electrophotographic film 24 is returned to the developer bottle 134 via the developer/-squeeze air outlet 102 and through the return pipe 146.

As explained before, the flow of the pressurized air is rather gentle in the beginning of the period of the supply of this air, thus preventing any undesirable blowing off of the necessary developer attaching to the exposed portion of the electrophotographic film 24. The blowing by air, however, is strengthened in the later period of the air supply, thereby ensuring the removal of any excessive residual developer on the electrophotographic film 24.

The application of the air blast is controlled by the charging exposure step for a subsequent frame which has been started in response to the pressing of the recording button at the position (II) in FIG. 16. The application of the air blast is suspended at the same time as the drive of the film moving motor (C) is started at the time when a predetermined period of time has elapsed after the solenoid 234 of the film pressing mechanism has been de-energized at the position (IIA) in FIG. 16, thus completing the developing and squeezing step.

It should be noted that the presence of the developing electrode 96 during the developing operation enables obtaining of an image having no edge effect. In addition, the application of a bias voltage to the developing electrode 96 prevents fogging of the image. It is also possible to improve the image reproducibility by applying, in the course of the development, a high voltage in the form of pulses of the same polarity as the toner particles.

When the drive of the film moving motor (C) is suspended, the film 24 has been moved rightwardly as viewed in FIG. 6 by an amount corresponding to one frame, so that a frame which has been positioned at the developing section 66 is now positioned at the drying section 68. When a predetermined period of time has elapsed after the drive of the film moving motor (C) has been suspended, the solenoid 234 of the film pressing mechanism is energized at the position (IIB) in FIG. 16 and, at the same time, the air pump 181 shown in FIG. 12 is activated so that pressurized air is supplied through the pipe 177. In consequence, the air heated by the heater 179 is blown into the drying chamber 174 from the warm air outlet 176 in the drying section 68, and the developer 136 is thereby dried. The operation of the air pump 181 is controlled by the charging exposure step which is started when the recording button is pressed at the position (III) in FIG. 16, and suspended at the same time as the solenoid 234 of the film pressing mechanism is de-energized at the position (IIIA) in FIG. 16, thus completing the drying step.

The temperature of the warm air which is supplied to the drying chamber 174 is detected by the temperature sensor 182 and a control is effected in response to the output of this sensor so as to maintain the temperature constant. The drying chamber is larger in size than the developing chamber so that the film which has been wetted through development can be dried entirely even at its peripheral edge portions.

Although in the above-described embodiment the drying air pump 181 is activated in response to the energization of the solenoid 234 of the film pressing mechanism and only when the film 24 is being pressed against the processing head 54, the air pump 181 may be operated at all times from the start of the operation of the apparatus.

After the solenoid 234 of the film pressing mechanism has been de-energized at the position (IIIA) in FIG. 16, the film moving motor (C) is activated, and the frame which has been positioned at the drying section 68 is thereby moved to the fixing section 70. After the drive of the film moving motor (C) has been suspended, the solenoid 234 of the film pressing mechanism is energized at the position (IIIB) in FIG. 16 and, at the same time, the air pump 195 shown in FIG. 13 is activated to supply cold air to the space 190 in the fixing section 70. The cold air supplied to the space 190 passes through the area defined at the upper edge of the glass plate 186 to reach the fixing chamber 188.

When a predetermined period of time has elapsed after the solenoid 234 of the film pressing mechanism has been energized, the xenon lamp 192 is turned ON, so that the toner particles are fused and fixed to the surface of the film 24, thus completing the fixing step.

Any matter which is vaporized or scattered during the fixing operation is blown off by means of the cold air supplied from the air pump 195, and there is no fear of such matter adhering to the surface of the glass plate 186.

When the above-described steps are finished, the recording of an image on the electrophotographic film 24 is completed.

In the apparatus according to this embodiment, when the recording button is pressed, recording is started, and after the recorded frame positioned at the charging exposure section 64 has been moved to the developing section 66 and when a predetermined period of time has elapsed after the solenoid 234 of the film pressing mechanism has been energized, it becomes possible to record a subsequent frame. To effect continuous recording of following consecutive frames, the recording button is pressed during the period which begins when it becomes possible to record a subsequent frame and which ends when a predetermined period of time has elapsed after the completion of the application of a relatively weak blast to the developing section 66 by the pressure squeezing air pump 144. In consequence, the recording step is repeated, and the processing proceeds as shown in FIG. 16.

When the recording button is not pressed during said period, or when the command to end a series of recording operations is input from the control keyboard 28, the application of a relatively strong blast by the air pump 144 is suspended in accordance with the operation of a timer, and the drying and fixing operations carried out thereafter are also executed in accordance with the timer.

It is possible to project the film 24 having images of documents recorded thereon as described above, when the reader mode is selected. When a given frame is moved to and stopped at the charging exposure section 64 by an operation similar to the above, the light source of the projecting light source section 46 shown in FIG. 3 is turned ON, and the light from the light source is passed through the through-hole 200 provided in the pressing plate 198 and transmitted by the film 24, and the image recorded on the film 24 is projected on the screen in a greater scale 16 by the optical system shown in FIG. 3

During this projecting operation, any part of the projecting light which tends to be scattered laterally from the light path between the projecting light source and the through hole 200 is effectively intercepted by the light-shielding plate 201 and the side plates 47A on the mirror, whereby any unfavorable effect on the frames adjacent to the frame to be projected, which may otherwise be caused by the scattered portion of the projecting light, is avoided advantageously.

In addition, the air pump 89 shown in FIG. 7 is started simultaneously with the turning on of the light source, so that cold air is supplied to the charging exposure chamber 72 so as to prevent overheating of the electrophotographic film 24 due to the heat of the projecting light, thereby preventing any out-of-focus state which may be caused by a thermal distortion of the film.

In the reader mode, it is possible to continuously view projected images of the film 24 within a shout period of time by successively advancing the film 24 for each frame through the control keyboard 28. In such case, every time the film 24 is moved, the shutter (A) is closed in order to prevent flickering due to persistence phenomenon.

When the copy button on the control keyboard 28 is pressed while an image is being projected on the screen 16, the copy mode is selected. In consequence, the copy mirror 52 is moved, and the image being projected on the screen 16 is recorded on a sheet of copying paper 30 by the optical system shown is FIG. 4.

In the described embodiment, the developer 136 in the developer bottle 134 is temporarily stored in the developer tank 126 and is supplied to the developing section as the solenoid valve 120 is opened. This arrangement, however, is only illustrative and the arrangement may be such that the developer 136 is directly fed from the developer bottle 134 to the developing section by the operation of the developer pump 130. In such a case, the developer which is being returned through the return pipe 140 branching from an intermediate portion of the pipe 132 is detected by the detector 163B and the voltage of the power supplied to the motor 128 is controlled in accordance with the signal from this detector 163B.

In the embodiment the pressing plate 198 is disposed in a small space defined by the recess portion 320 of the cassette case 316 and it serves to press the electrophotographic film 24 onto the processing head 54 facing the pressing plate 198. In the embodiment, thus, the arrangements of the illumination systems and the optical systems of the electrophotographic apparatus in which the light-shield must be taken into consideration are restricted spatially.

In the above embodiment the electrophotographic film has been used as one example of the photosensitive films, but the application of the present invention is not limited to the electrophotographic film. The present invention will be applicable to any known film on which an image is formed by utilizing sensitization (exposure), for example the electrophotographic migration imaging film, the silver halide film, and so on. In the embodiment, also, the film pressing device according to the present invention has been applied for positioning the electrophotographic film for exposure or projection to the processing head for processing the electrophotographic film, but it is not limited to the application in the embodiment. That is to say, the film pressing device according to the present invention can be applied to any apparatus having a positioning (pressing) means for conducting both the exposure for forming an image on the photosensitive film and the projection of the formed image at an identical position.

As will be fully understood from the foregoing description, the present invention provides a film pressing device for use in an apparatus in which an exposure forming an image on a photosensitive film and a projection of the image formed are effected at an identical position, designed for pressing the photosensitive film at the identical position, wherein, when the apparatus is used in the projecting mode, the projecting light is prevented, by a light shielding plate disposed on one side of the through-hole through which the projecting light impinges upon the frame to be projected, from reaching frames adjacent to the frame to be projected. Thus, the risk for the undeveloped frame to be accidentally exposed to the projecting light is effectively avoided.

Also, the present invention is effectively applied to the film pressing device having the through-hole for allowing the projecting light to pass therethrough, which is adapted for use in the apparatus where the exposure and the projection are effected at the identical position under the spatial restriction.

Although the invention has been described through specific terms, it is to be noted here that the described embodiment is only illustrative and various changes and modifications may be imparted thereto without departing from the scope of the invention which is limited solely by the appended claims.

What is claimed is:

1. A film pressing device for use in an apparatus in which an exposure for forming an image on a photosensitive film and a projection of the image formed on said photosensitive film are effected at an identical position, comprising:

pressing means for pressing said photosensitive film at said identical position;

a through-hole formed in said pressing means and adapted for allowing a projecting light to pass therethrough for the purpose of projecting said image formed on said photosensitive film; and light-shielding means for preventing the portion of said projecting light failing to pass through said through-hole from impinging upon said photosensitive film.

2. A film pressing device according to claim 1, wherein said light-shielding means includes a light-shielding plate provided on said pressing means and disposed at one lateral side of said through-hole.

3. A film pressing device according to claim 2, wherein said light-shielding means further includes side plates provided on both sides of a reflection mirror for reflecting said projecting light towards said through-hole, said light-shielding plate being disposed in superposed relation to said side plates.

4. A film pressing device according to claim 3, further comprising driving means for driving said pressing means into and out of contact with said photosensitive film.

5. A film pressing device according to claim 2, wherein said pressing means includes a substantially rectangular pressing plate and said through-hole is formed in a portion of said pressing plate adjacent to one end of said pressing plate, said light-shielding plate being provided on a portion of said pressing plate between said one end of said pressing plate and said through-hole.

6. A film pressing device according to claim 5, wherein said through-hole is substantially rectangular and said light-shielding plate also is substantially rectangular, said light-shielding plate being substantially normal to said pressing plate.

7. In an electrophotographic apparatus having a processing head for effecting both exposure for forming images on an elongated electrophotographic film at a predetermined pitch and projection of each of the images formed on said electrophotographic film at an identical position, a film pressing device for pressing said electrophotographic film onto said processing head, comprising:

a pressing plate for pressing said electrophotographic film onto said processing head;

a through-hole formed in said pressing plate. for allowing said projecting light to pass therethrough for the purpose of projecting an image on said electrophotographic film; and a light-shielding plate for preventing the portion of said projecting light failing to pass through said through-hole from impinging upon said electrophotographic film.

8. A film pressing device according to claim 7, wherein said light-shielding plate is provided on said pressing plate so as to protrude therefrom at one lateral side of said through-hole.

9. A film pressing device according to claim 8, further comprising side plates provided on both sides of a reflection mirror for reflecting said projecting light towards said through-hole, said light-shielding plate being disposed in superposed relation to said side plates.

10. A film pressing device according to claim 8, wherein said pressing plate has a substantially rectangular form with its longitudinal axis extending in parallel with said electrophotographic film, and said through-hole is formed in a portion of said pressing plate adjacent to one end of said pressing plate, said light-shielding plate being provided on a portion of said pressing plate between said one end of said pressing plate and said through-hole.

11. A film pressing device according to claim 10, wherein said through-hole is substantially rectangular and sad light-shielding plate also is substantially rectangular, said light-shielding plate being substantially normal to said pressing plate.

* * * * *